United States Patent [19]
Kim et al.

[11] Patent Number: 6,121,507
[45] Date of Patent: Sep. 19, 2000

[54] METHOD FOR TREATING WASTEWATER CONTAINING HAZARDOUS MATTER USING ELECTRON BEAM IRRADIATION

[75] Inventors: Duk-Kyung Kim; Bum-Soo Han; Yu-Ri Kim; Mi-Joo Kim; Young-Hee Kim, all of Taejeon, Rep. of Korea; A. K. Pikaev, Moscow, Russian Federation; A. V. Ponomarev, Moscow, Russian Federation; I. E. Makarov, Moscow, Russian Federation

[73] Assignee: Samsung Heavy Industries Co., Ltd., Rep. of Korea

[21] Appl. No.: 08/878,344

[22] Filed: Jun. 18, 1997

[30] Foreign Application Priority Data

| Jun. 21, 1996 | [KR] | Rep. of Korea | 96-22983 |
| Jun. 21, 1996 | [KR] | Rep. of Korea | 96-22984 |
| Dec. 30, 1996 | [KR] | Rep. of Korea | 96-76923 |
| Dec. 30, 1996 | [KR] | Rep. of Korea | 96-76982 |

[51] Int. Cl.$^7$ .............................. A62D 3/00; C07C 1/00; C07C 4/00; C07B 63/00

[52] U.S. Cl. .......................... 588/225; 588/223; 588/224; 204/157.15; 204/158.2; 204/158.21

[58] Field of Search ........................ 588/223, 224, 588/225; 204/157.15, 158.2, 158.21

[56] References Cited

PUBLICATIONS

Tanizaki et al., "Study on Chemical Behavior of Trace Elements in River Water", Kyoto Daigaku Genshiro Jikkensho, [Tech. Rep.], KURRI-TR-353, 10, 1991, no month available and abstract only.

*Primary Examiner*—Kathryn Gorgos
*Assistant Examiner*—Edna Wong
*Attorney, Agent, or Firm*—Dilworth & Barrese

[57] ABSTRACT

A wastewater treatment method for processing wastewater containing hazardous matter is provided. The wastewater treatment method removes the hazardous matter by irradiating the electron beam into the wastewater. The wastewater treatment method adds various kinds of adsorbents into the wastewater according to the classes of the hazardous matters contained in the wastewater.

25 Claims, 9 Drawing Sheets

-○- 60mg/l GLUTEN
-●- 250mg/l FLOUR
-□- 2000mg/l CARBOXYMETHYL CELLULOSE
-■- 125mg/l CELLULOSE AND 125mg/l FLOUR
-△- 250mg/l CELLULOSE
-▲- 250mg/l STARCH

METHOD FOR TREATING WASTEWATER CONTAINING HAZARDOUS MATTER USING ELECTRON BEAM IRRADIATION

BACKGROUND OF THE INVENTION

The present invention relates to a treatment method of wastewater containing hazardous matter, and more particularly, to a wastewater treatment method for removing hazardous matter by irradiating electron beam on the wastewater.

Industrial waste derived from today's remarkable industrial development seriously affects natural environment. Further, water pollution due to industrial wastewater threatens potable water resource of mankind, to thereby cause a big social problem such as the ecological destruction in a natural world.

Particularly, heavy metal such as lead (Pb), cadmium (Cd), sexivalent chrome ($Cr^{6+}$) and mercury (Hg) and fluorion excess environmental restriction values, and are contained in industrial wastewater.

Such hazardous matter is very injurious to a human being and pollutes the quality of water and soil.

Thus, various methods for removing such hazardous matter have been under study. Among well-known methods for removing hazardous heavy metal, there are a hydroxide precipitation method, a sulfide or carbonate treatment method, and a method using a zeolite or corallite as an adsorbent. However, such conventional methods have the difficulties in processing of the wastewater with general chemicals due to various inhibit materials, and cannot completely process heavy metal due to a large amount of sludges generated in the case of wastewater containing a large amount of heavy metal.

Particularly, a conventional wastewater treatment or removal method for processing wastewater containing $Cr^{6+}$ reduces the $Cr^{6°}$ to trivalent Cr ions ($Cr^{3+}$) and precipitates the $Cr^{3+}$ under a base circumstance, to thereby remove the $Cr^{6+}$. That is, chromic acid $CrO_4^{2-}$ which is stable under a base circumstance is processed using Ferrous Sulfate ($FeSO_4$) and sodium sulfite $Na_2SO_3$ both of which are reducing agent, and reduced to $Cr^{3+}$. Then, pH condition is maintained pH8.5 by sodium hydroxide or calcium hydroxide to thereby precipitate and filter chrome hydroxide. In this case, a process of neutralizing remaining solution and discharging the neutralized solution is additionally required. Thus, this method requires a complicated multiple processing and uses a large amount of chemicals, thereby much costs being required.

Also, a conventional wastewater treatment method for processing wastewater containing bivalent Hg ions ($Hg^{2+}$) follows a general heavy metal ion removal method. However, such a general heavy metal removal method is not particularly efficient for removing $Hg^{2+}$.

The above heavy metal processing methods require multiple chemical processing so that it needs to take a long processing time. Such methods use a large amount of chemicals, and thus cause processing costs to be high. Also, they do not perfectly remove hazardous heavy metal.

Meanwhile, among conventional methods for removing fluorine from wastewater, there are a metallic salt (generally Ca compound) addition method, a method of using an ion exchange resin and an active alumina, a method of using a rare-earth compound as an adsorbent of fluorion, and a method of using a solution of a rare-earth compound and an alkali compound.

The Ca compound addition method uses Ca compounds, such as $Ca(OH)_2$ and $CaCl_2$, single or in combination, to precipitate and separate the fluorion into water-insoluble $CaF_2$. This method is most generally used as a high concentration fluorine processing method so far, which however requires a long-time processing. Also, reaction between the Ca compound and the fluorine is explained as a chemical equilibrium of acid and base between the reactants and products. A removal rate of the fluorine is also obtained up to a value expected from the chemical equilibrium constant (10 ppm at an optimal condition and 15 ppm in a general condition). Thus, it needs a large amount of chemicals to lower the concentration, which causes a large amount of sludges to occur.

The method of using an ion exchange resin and an active alumina which removes dissolved fluorion via the ion exchange, has a difficulty in removing a high concentration fluorine due to an exchange capacity of the ion exchange resin. Such a method can not process a large amount of wastewater and remove negative ions so that efficiency is lower when removing fluorine. Also, the process requires a high cost.

The method of using a rare-earth compound as a fluorion adsorbent adsorbs fluorion by exchanging the fluorion in the solution with hydroxide ion ($OH^-$) contained in the rare-earth hydroxide. This method removes the fluorion at high efficiency up to several ppm or so, when compared with the others. However, a production cost of the rare-earth hydroxide is high and an equivalent weight of hydroxide ion ($OH^-$) is lower than weight of added rare-earth hydroxide, which requires a large amount of chemicals in comparison with the fluorion to be processed. Also, since the exchange function is performed only in the acid solution, the pH of alkaline wastewater should be adjusted by an acid.

The method of adding soluble material composed of rare-earth compounds and making the fluorion insoluble to separate them is excellent in removing the fluorion even though the amount of chemicals used and the amount of the remaining sludges are small. However, the chemicals are expensive in price and the size of particle of the floating precipitate is small, it takes long time to precipitate them.

The above fluorion removal methods using the chemical process require a long-time processing, and a high processing cost due to a large amount of chemicals required, and produce a large amount of sludges. It is difficult to dispose the produced sludges. Thus, the above-described methods are not efficient for lowering the fluorion containing ratio down to a low concentration (several ppm). As a result, these conventional chemical processing methods are improper in countermeasuring environmental regulation. Finally, if these conventional chemical processing methods are used, an enormous amount of water is required for diluting the fluorion concentration which is not sufficiently low, so as to discharge the wastewater containing the fluorion.

SUMMARY OF THE INVENTION

To solve the above problems, it is an object of the present invention to provide a new wastewater treatment method which can remove hazardous matter economically and high-efficiently.

To accomplish the above object of the present invention, there is provided a wastewater treatment method according to one aspect of the present invention, the wastewater treatment method comprising the steps of: adding an adsorbent used as complex which can be reacted on hazardous matter, in the wastewater containing the hazardous matter;

irradiating electron beam onto the wastewater added with the adsorbent to accelerate the reaction between the adsorbent and the hazardous matter; and precipitating and removing the condensed particles which are formed in step of irradiating.

It is preferable that the wastewater treatment method further comprises, between the steps of adding and of precipitating and removing, a step of bubbling the wastewater by injecting a gas selected from the group consisting of air, nitrogen gas, and argon gas into the wastewater, in order that the electron beams are efficiently irradiated.

According to another aspect of the present invention, there is also provided a wastewater treatment method for processing wastewater containing $Cr^{6+}$, the wastewater treatment method comprising the steps of:

irradiating electron beam onto wastewater in order to convert $Cr^{6+}$ into $Cr^{3+}$:

and bubbling the wastewater by injecting a gas selected from the group consisting of air, nitrogen gas, and argon gas into the waste water, in order that the electron beam are efficiently irradiated.

BRIEF DESCRIPTION OF THE DRAWINGS

The preferred embodiments are described with reference to the drawings wherein.

DETAILED DESCRIPTION OF THE PREFERRED EMBODIMENTS

Preferred embodiments of the present invention will be described in detail with reference to the accompanying drawings.

First embodiment

Figure 1:
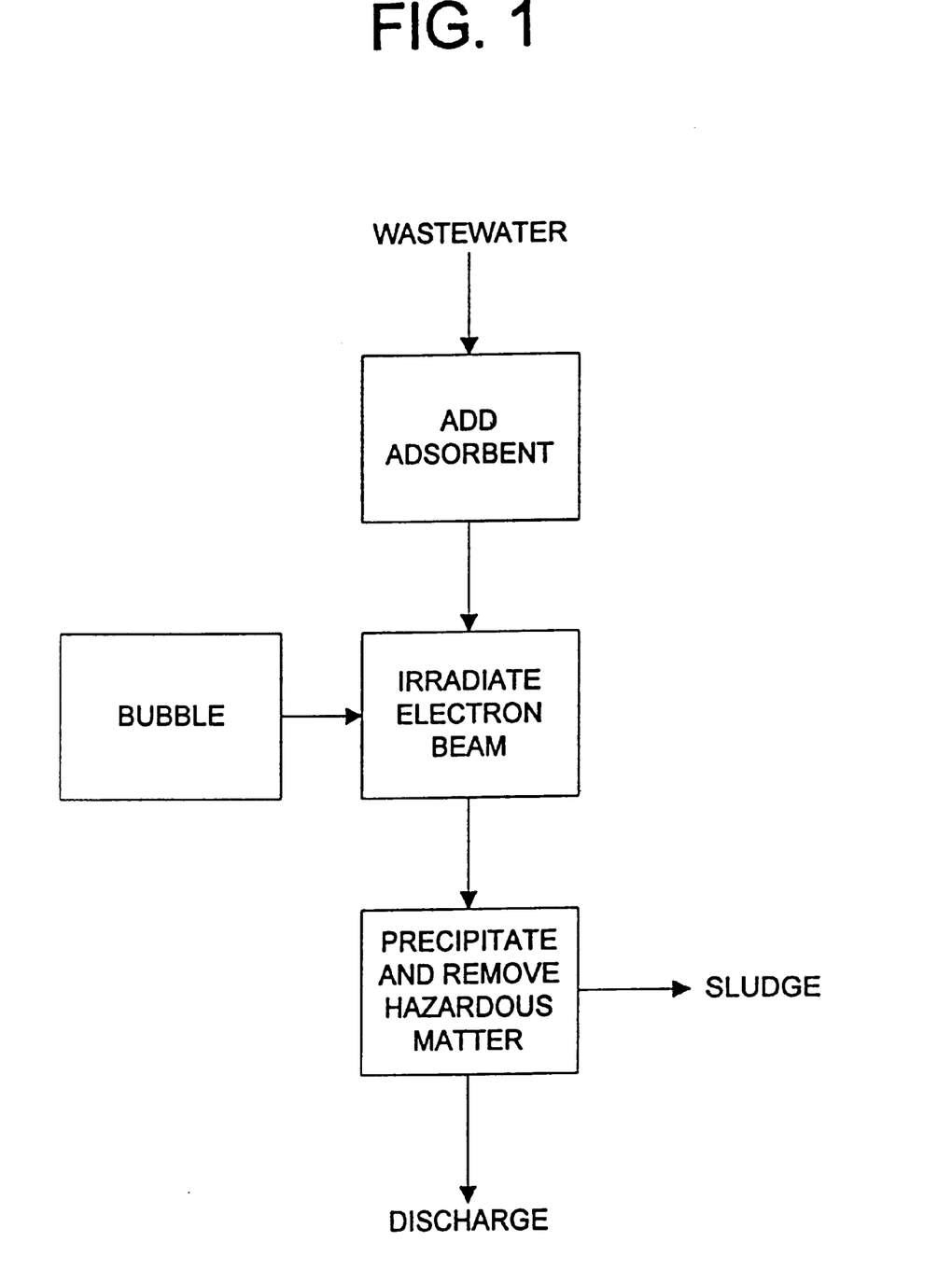
FIG. 1 is a flow-chart diagram showing a wastewater treatment processing according to a preferred embodiment of the present invention.

As shown in FIG. 1, the wastewater treatment method according to a preferred embodiment of the present invention basically includes an adsorbent addition step, an electron beam irradiation step, and a precipitation removal step.

Figure 2:
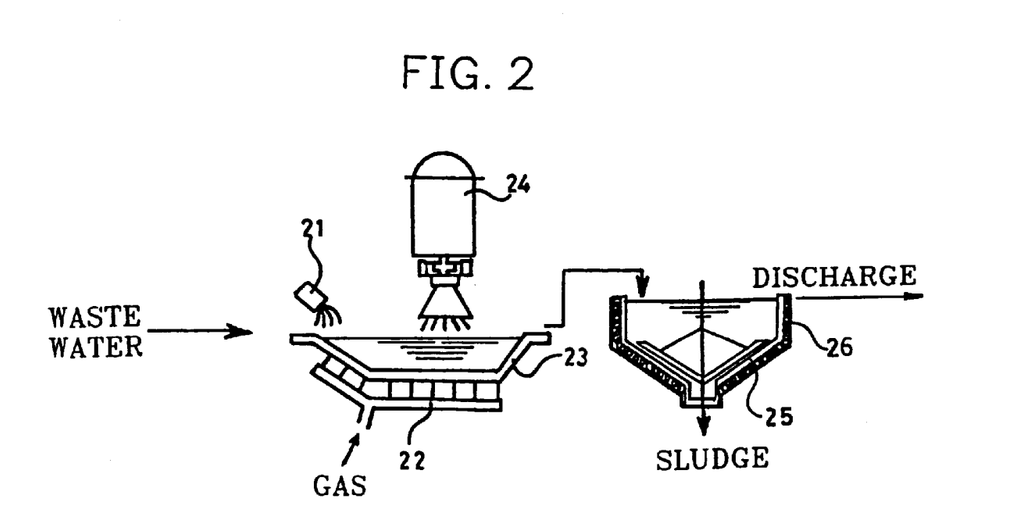
FIG. 2 is a schematic diagram of a wastewater treatment apparatus of the FIG. 1 embodiment.

The adsorbent addition step adds an adsorbent which can be ionized with hazardous matter to the wastewater containing the hazardous matter, such as Pb, Cd, Cr, Hg and $F_2$. The adsorbent is added in the wastewater by an injector 21 before the wastewater is accommodated in an electron beam reactor tank 23.

The types of the such an adsorbent will be described later.

The electron beam irradiation step irradiates the electron beam generated by an electron beam accelerator 24 onto the wastewater mixed with the adsorbent. The wastewater mixed with the adsorbent and containing the hazardous matter flows in the electron beam reactor tank 23 and irradiated by the electron beam generated by the electron beam accelerator 24 which is installed spaced by a predetermined distance from the surface of the wastewater. The wastewater in the reactor tank 23 is mixed with the adsorbent by bubbling gas which is blown from the lower of the reactor bank 23, during irradiating the electron beam. The adsorbent irradiated by the electron beam and the hazardous matter actively react each other, to thereby reduce the hazardous matter.

The precipitation removal step which precipitates and removes the condensed particles adsorbing the hazardous matter by irradiating the electron beam, is performed in a precipitation tank 25. Then, a heater 26 can heats the wastewater as necessary.

Also, as shown in FIGS. 1 and 2, it is possible that the step of bubbling the wastewater by injecting bubbling gas is included between the adsorbent addition step and the precipitation removal steps. Thus, the preferred embodiment of the present invention can be modified so that the modification includes an adsorbent addition step, a bubbling step, an electron beam irradiation step, and a precipitation removal step.

The bubbling step blows a bubbling gas into the wastewater containing the heavy metal from the lower side of the electron beam reactor tank 23, from the adsorbent addition step to the electron beam irradiation step, by a bubbling apparatus 22 installed in the lower side of the election beam reactor tank 23. The bubbling gas injected into the wastewater containing the heavy metal forms bubbles so that the heavy metal-contained wastewater can be mixed with the adsorbent completely and the electron beam can be irradiated into the wastewater containing the heavy metal in depth, accordingly a reaction efficiency of the heavy metal ions and the adsorbent is further heightened.

Air, nitrogen or argon gas can be used as the bubbling gas in the bubbling step. More preferably, nitrogen or argon gas being an inert gas is used.

Hereinafter, the types of the adsorbents which are used for the classes of the hazardous matter and the wastewater treatment method will be described in more detail.

Processing of wastewater containing lead and/or cadmium

First, a wastewater treatment method for processing wastewater containing Pb and/or Cd as hazardous matter will be described. It is required to disable a hydroxyl (OH) radical which prevents reduction of ions $Pb^{2+}$ and $Cd^{2+}$ in order to remove the hazardous matter such as the ions $Pb^{2+}$ and $Cd^{2+}$.

Thus, the wastewater treatment method according to the present invention adds formate into the wastewater containing the hazardous matter as an adsorbent. Here, the concentration of the formate is appropriately $10^{-4} \sim 10^{-1}$M. Also, it is preferable that sodium formate is used as the formate.

The wastewater containing the heavy metal added with the formate flows into the reactor tank 23.

The electron beam accelerator 24 is installed in the upper portion of the reactor tank 23, to enable the electron beam to be efficiently irradiated into the wastewater containing the heavy metal. The OH radical generated by irradiation of the electron beam is disabled by the formate included in the heavy metal wastewater. The $Pb^{2+}$ and $Cd^{2+}$ ions dissolved in the heavy metal wastewater are reduced, and deposits as metal and removed from the wastewater.

Meanwhile, the bubbling apparatus 22 is installed in the lower side of the reactor tank 23 and the bubbling gas is injected into the wastewater, in order to uniformly irradiate the electron beam into the accommodated heavy metal wastewater. The bubbling gas forms bubbles in the wastewater, and thus enhances a reaction efficiency between the heavy metal ions and the adsorbent. Air, nitrogen or argon gas can be used as the bubbling gas. More preferably, the nitrogen or argon gas being an inert gas is used.

The wastewater irradiated by the electron beam can flow into the precipitation tank 25 and heated by the heater 26. The lead and cadmium existing in the wastewater are efficiently deposited by the heating by the heater 26. The deposited lead and cadmium are precipitated and removed in the precipitation tank 25. As a result, the wastewater from which the lead and cadmium have been removed, is discharged. Here, it is proper to heat the wastewater for within 20~30 minutes at about 60° C.~90° C. It is preferable to heat the wastewater for 30 minutes at about 90° C. If the heating time excesses 30 minutes, the heavy metal ions are again reduced and dissolved into the wastewater.

Figure 3:
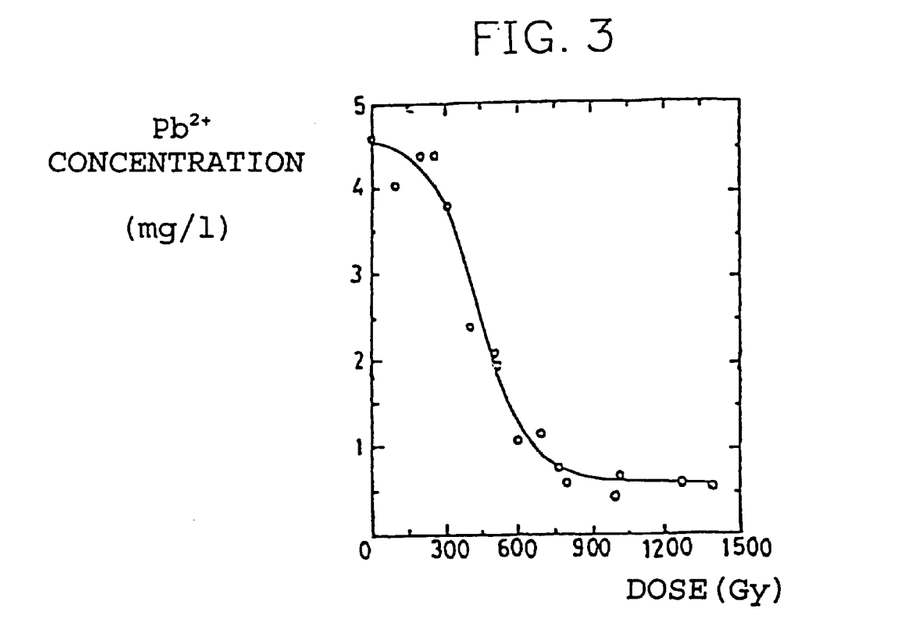
FIG. 3 is a graphical view showing change in concentration of $Pb^{2+}$ according to the amount of irradiated electron beam.

FIG. 3 shows the change in concentration of $Pb^{2+}$ according to the amount of irradiated electron beam. The FIG. 3 shows the concentration of the lead ions (vertical axis) contained in the wastewater with respect to the amount of the irradiated electron beam (horizontal axis), when $10^{-2}$M of the sodium formate is contained in the wastewater. As can be seen from the FIG. 3, the concentration of the lead ions becomes minimal when the amount of the irradiated electron beam is more than 0.7 kGy and the best efficient amount of the irradiated electron beam is 0.6~0.8 kGy. In this case, the lead ions of about 86% are removed.

Figure 4:
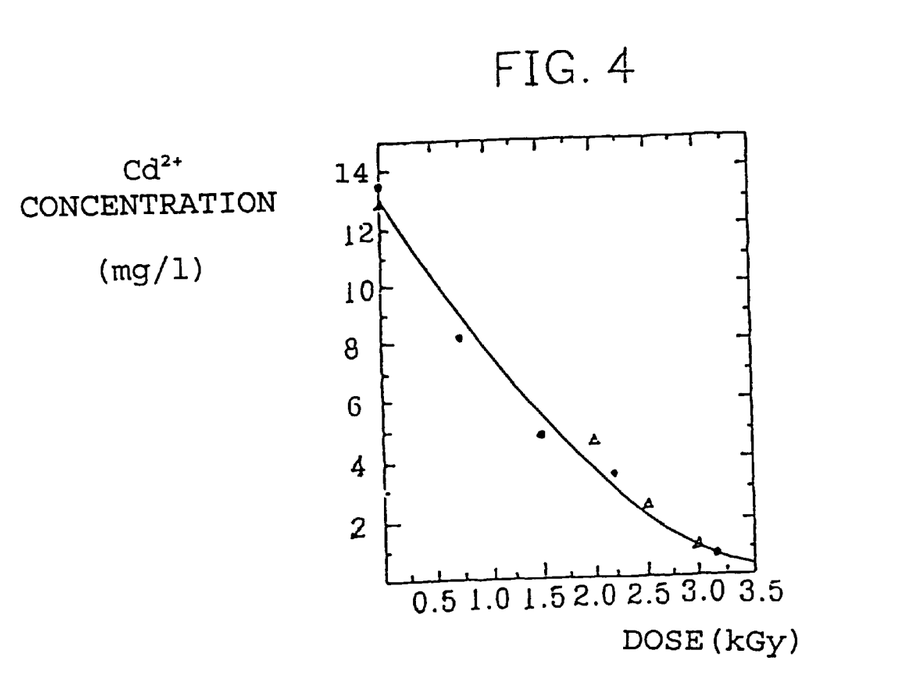
FIG. 4 is a graphical view showing change in concentration of the $Cd^{2+}$ according to the amount of irradiated electron beam.

FIG. 4 shows the change in concentration of the $Cd^{2+}$ according to the amount of irradiated electron beam. The FIG. 4 shows the concentration of the cadmium ions (vertical axis) in the wastewater with respect to the amount of the irradiated electron beam (horizontal axis), when $10^{2+}$M of the sodium formate is contained in the wastewater. As can be seen from the FIG. 4, the concentration of the cadmium ions is continuously decreases until the amount of the irradiated electron beam reaches 2.5~3.5 kGy, in which case the cadmium ions of approximate 95% are removed. Also, the cadmium ions is removed up to 95% in the condition of 3.5 kGy.

As can be seen from the above embodiments, the wastewater containing the heavy metal such as the lead and/or the cadmium can be easily processes by adding the formate into the wastewater and irradiating the electron beam thereinto.

Processing of wastewater containing chrome and/or mercury

First, a wastewater treatment method for processing wastewater containing $Cr^{6+}$ and/or $Hg^{2+}$ will be specifically described, which is the same as those of the processing method described with reference to FIG. 1 and FIG. 2. In this embodiment, only the adsorbent to be used and the amount of the irradiated electron beam to remove the hazardous matter are specified. Here, an inorganic or organic matter which can adsorb the heavy metal ions is generally used as an adsorbent for the wastewater containing the $Cr^{6+}$ and/or $Hg^{2+}$ ions. Among them, a vegetable natural organic matter, that is, cellulose, carboxymethyl cellulose, starch, flour, or gluten as, water insoluble vegetable protein complex, and so on is chiefly used. It is more excellent in adsorption efficiency to add a vegetable natural organic matter containing a many protein component of a structure of a polypeptide combination as in the flour and the gluten among the vegetable natural matters. Therefore, it is preferable since an efficiency of removing the $Cr^{6+}$ and/or $Hg^{2+}$ ions becomes high. Particularly, it is economical to use flour which can be easily obtained in nature and at low costs and contains a protein component having a water-insoluble polypeptide structure.

Hereinafter, this embodiment will be described in more detail via experimental examples.

<Experimental example 1>

Figure 5:
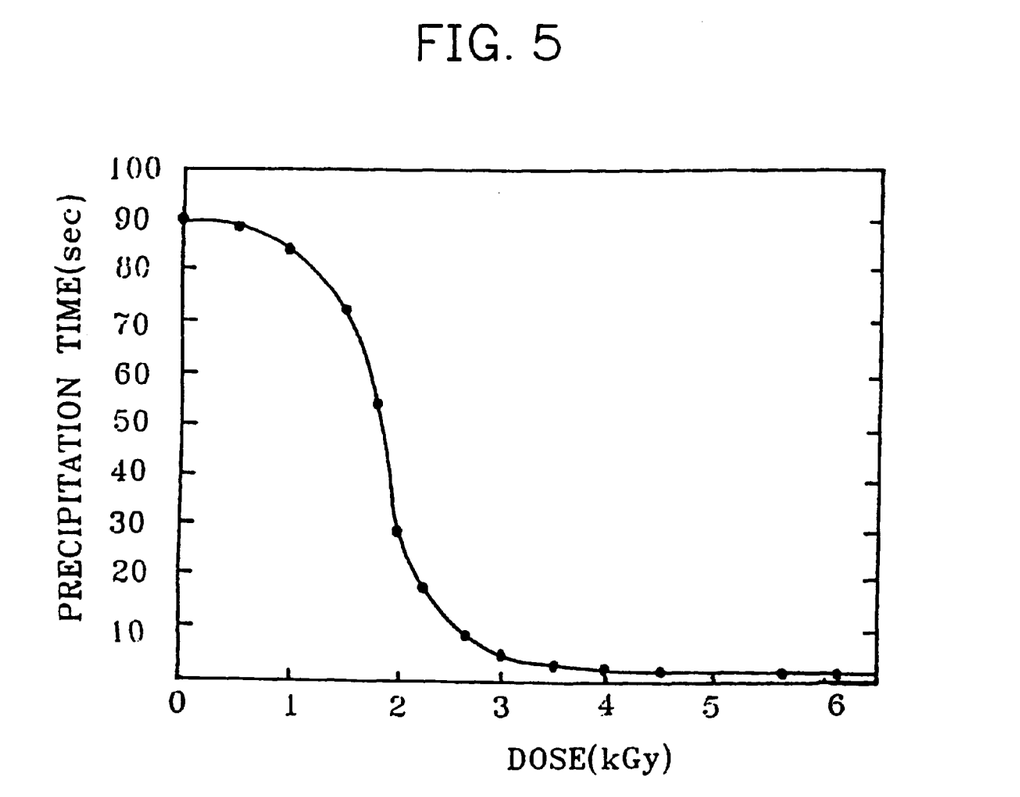
FIG. 5 is a graphical view showing the change in precipitating velocity of flour (adsorbent) according to the amount of irradiated electron beam.

FIG. 5 shows the change in precipitating velocity of flour (adsorbent) according to the amount of irradiated electron beam. In this experiment, flour is used as an adsorbent and the amount of the irradiated electron beam varies from 0 kGy to 6 kGy.

As a result, when the electron beam is not irradiated at all as in FIG. 5, it takes about 90 seconds to precipitate flour, while a precipitation velocity is quickly increased according to the irradiation of the electron beam, in which case the precipitation time becomes about 5 seconds or shorter when the amount of the irradiated electron beam is about 3 kGy.

Thus, it can be seen that the precipitation is more easily and speedily accomplished if the adsorbent adsorbing the heavy metal by the irradiation of the electron beam is used, which shortens a processing time and reduces the size of the precipitation tank on a considerable scale.

<Experimental example 2>

Figure 6:
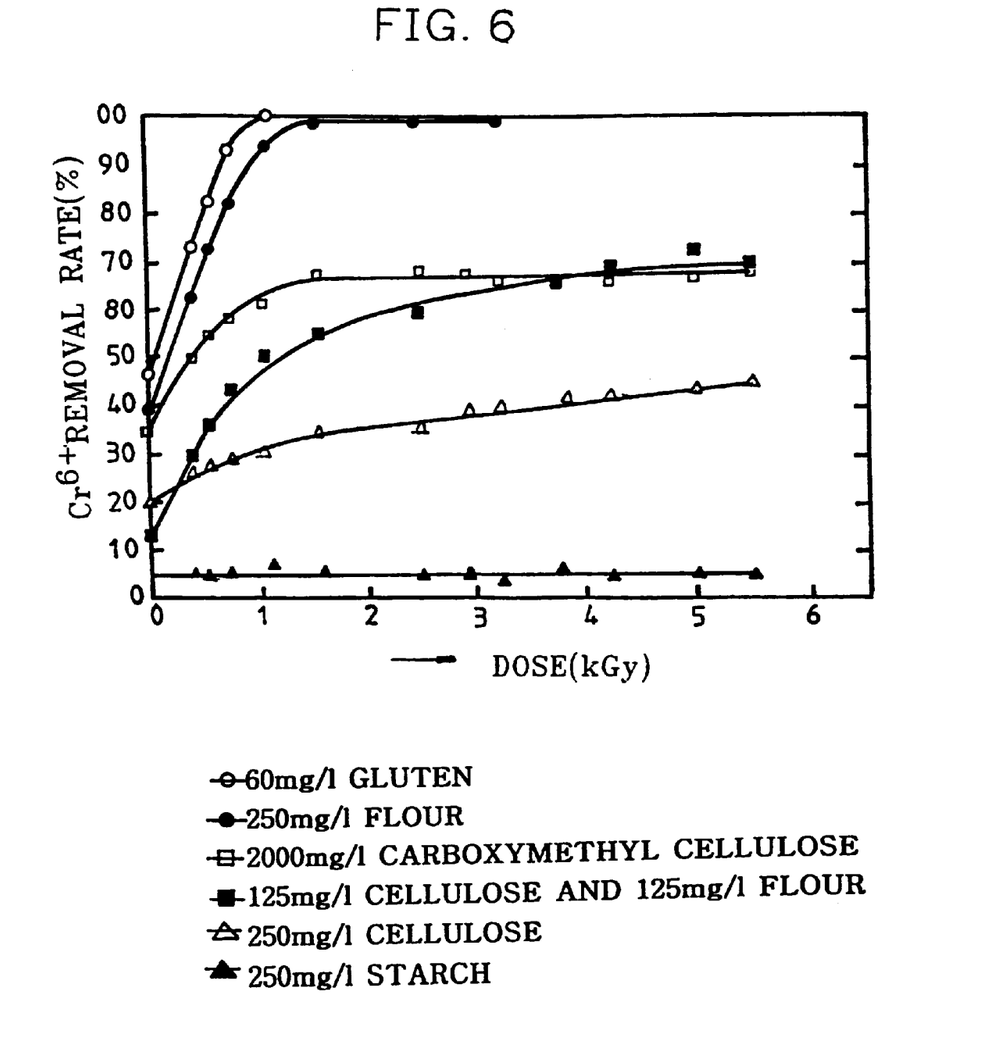
FIG. 6 is a graphical view showing the rate of removal of $Cr^{6+}$ according to the amount of irradiated electron beam by the type of an adsorbent.

FIG. 6 shows the rate of removal of $Cr^{6+}$ ions according to the amount of irradiated electron beam by the type of an adsorbent.

The heavy metal which is an object to be processed in this experiment is $Cr^{6+}$ ions of an initial concentration of 5 mg/l. The six kinds of the adsorbents are added as shown in FIG. 6, and argon gas is injected to form bubbles therein. The electron beam is irradiated between 0–6 kGy.

As a result, each case when the flour of about 250 mg/l and the gluten of about 60 mg/l are added, indicates an excellent effect representing a removal rate of about 99% or higher of the $Cr^{6+}$ ions even with a smaller amount of the irradiated electron beam. Particularly, it can be seen that the case where the flour of about 250 mg/l is added, provides the same effect as that of the case where the gluten of about 60 mg/l is added even with a smaller amount of the irradiated electron beam at the same initial concentration. The reason is because the gluten contains protein of about 90 wt % while the flour contains protein of about 20 wt % in which the protein has a polypeptide combination structure.

Thus, it is preferable that the flour or gluten containing much a amount of protein components is used as an adsorbent. Particularly, the flour is more economical in view of costs. It can be seen that when the initial ion concentration of $Cr^{6+}$ is high, that is, more than 10 ppm, it is more effective to use gluten.

Also, a preferable condition for removing the $Cr^{6+}$ can be seen from this experiment. That is, it is more economical if flour of about 500 mg/l or smaller is added as an adsorbent in a general case, and the amount of irradiated electron beam is 2.0 kGy or below. When the initial ion concentration of $Cr^{6+}$ is high, it is more effective to add gluten of about 100 mg/l or smaller as an adsorbent at the same condition. As the most preferable condition, it is most economical if flour of about 100~250 mg/l is added as an adsorbent in a general case, and the amount of irradiated electron beam is 1.5–2.0 kGy. When the initial ion concentration of $Cr^{6+}$ is high, it is more effective to add gluten of about 30~60 mg/l as an adsorbent at the same condition and to irradiate the electron beam of 1.0–2.0 kGy.

<Experimental example 3>

Figure 7:
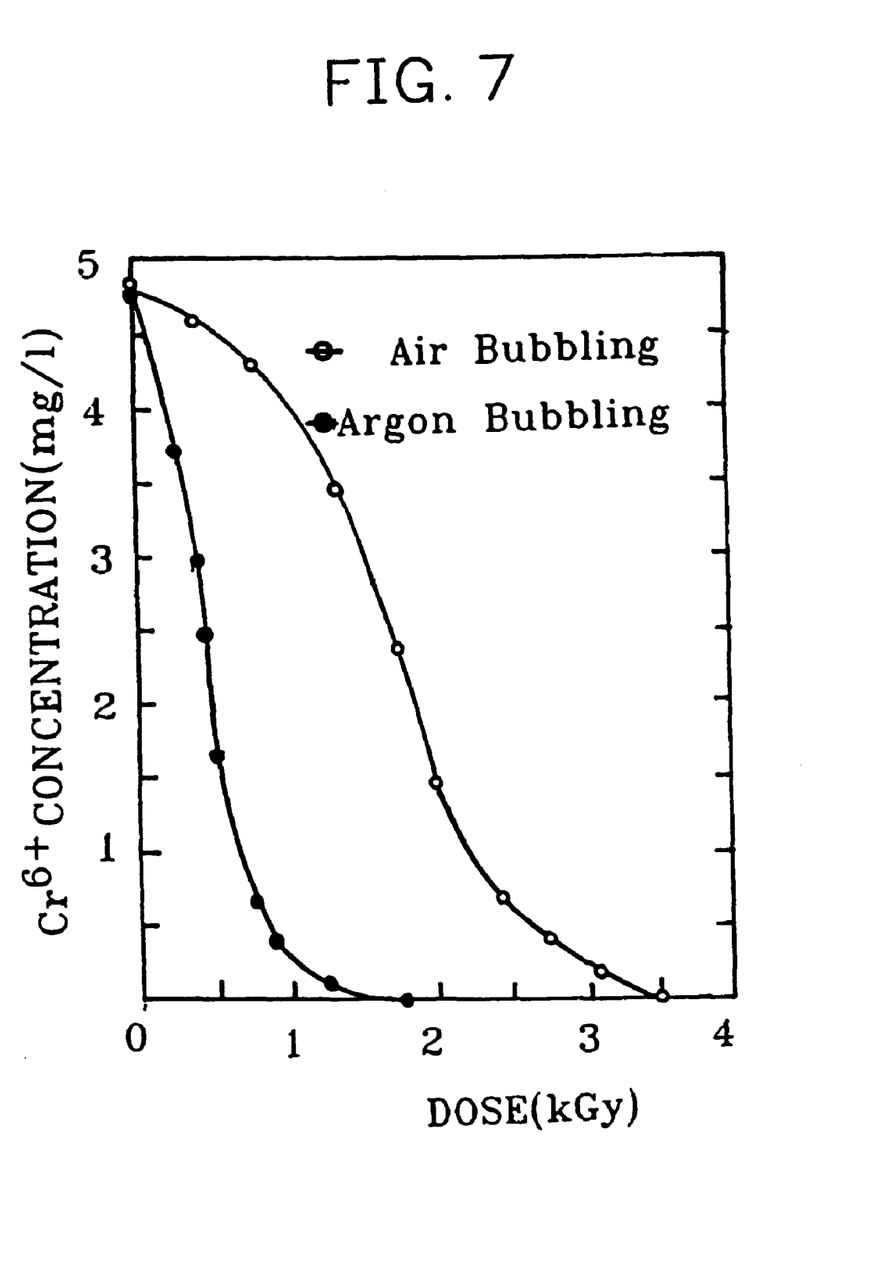
FIG. 7 is a graphical view showing the change in concentration of the $Cr^{6+}$ according to the amount of irradiated electron beam by the type of a bubbling gas.

FIG. 7 shows the change in concentration of $Cr^{6+}$ ions according to the amount of irradiated electron beam by the type of a bubbling gas.

The heavy metal which is an object to be processed in this experiment is $Cr^{6+}$ ions. The flour are added as an adsorbent and air and argon gas is injected as a bubbling gas to form bubbles therein. The electron beam are irradiated between 0–4 kGy.

As a result, as shown in FIG. 7, a case where argon gas being an inert gas is used as the bubbling gas can almost perfectly remove $Cr^{6+}$ ions (more than 99%) with a smaller amount of irradiated electron beam, than that where air is used as the bubbling gas. The reason appears that the oxygen existing in the air delays the heavy metal removal. Thus, it is more effective to use nitrogen or argon being the inert gas than to use air containing oxygen.

<Experimental example 4>

Figure 8:
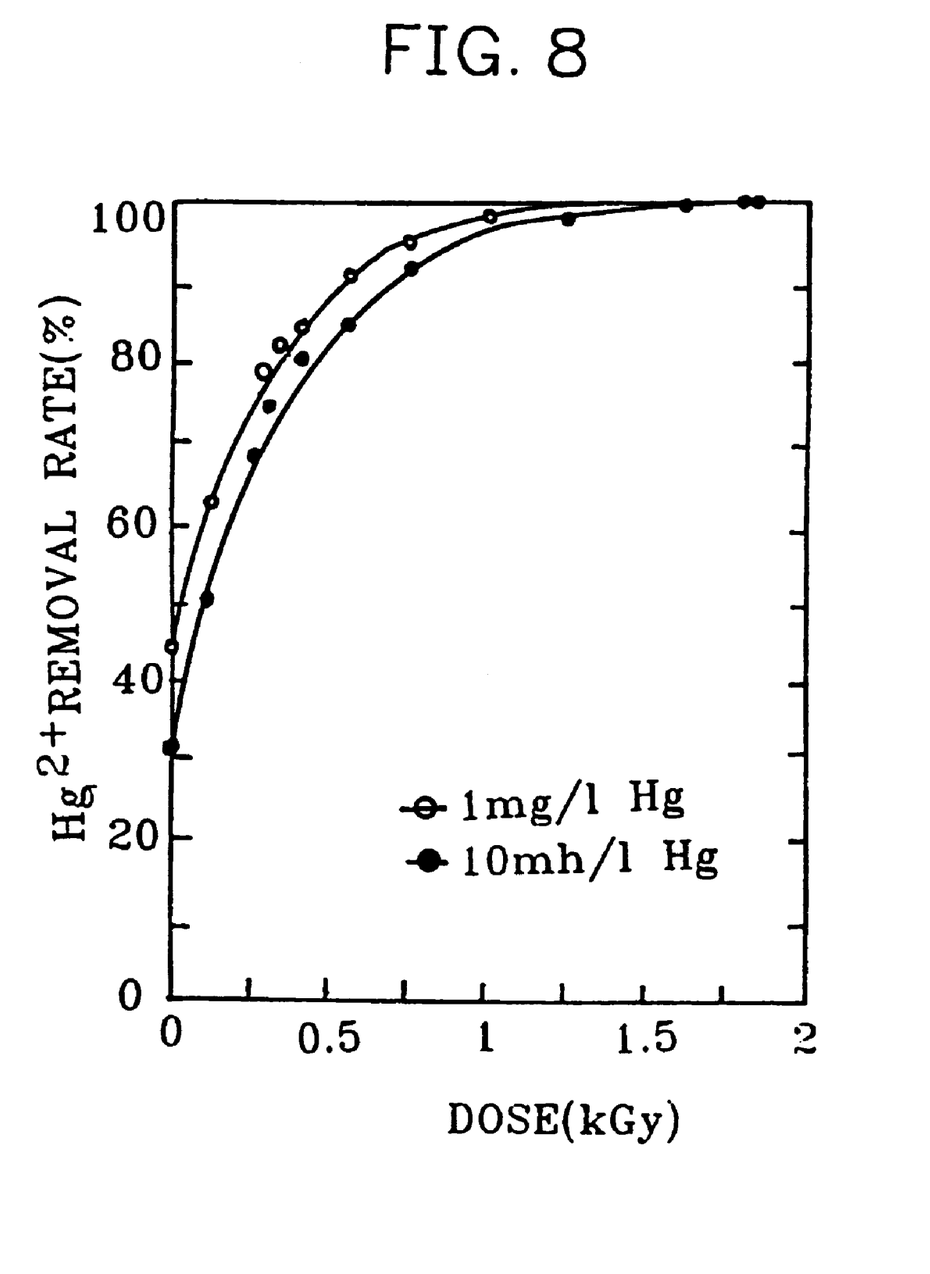
FIG. 8 is a graphical view showing the rate of removal of mercuric ions ($Hg^{2+}$) according to the amount of irradiated electron beam.

FIG. 8 shows the rate of removal of mercuric ions ($Hg^{2+}$) according to the amount of irradiated electron beam.

The heavy metal which is an object to be processed in this experiment is $Hg^{2+}$ ions. The flour of 250 mg/l is added as an adsorbent with respect to both cases when the initial concentration are 1 mg/l and 10 mg/l and argon gas is injected as a bubbling gas to form bubbles therein. The electron beam are varied and irradiated between 0–2 kGy.

As a result, as shown in FIG. 8, both cases represent excellent removal rate of $Hg^{2+}$ ions of 99% or more when the amount of irradiated electron beam is 1.5 kGy or more. However, a case when the initial concentration is lower than the other, that is, Hg concentration of 1 mg/l represents a higher removal rate at the amount of irradiation of 1.5 kGy or below.

Thus, a preferable condition for removing the $Hg^{2+}$ ions can be seen from this experiment. That is, it is more economical if flour of about 500 mg/l or smaller is added as an adsorbent in a general case, and the amount of irradiated electron beam is 2.0 kGy or below. When the initial ion concentration of Hg is high, it is more effective to add gluten of about 100 mg/l or smaller as an adsorbent at the same condition. As the most preferable condition, it is most economical if flour of about 100~250 mg/l is added as an adsorbent, and the amount of irradiated electron beam is 1.5–2.0 kGy in a general case. When the initial ion concentration of Hg is high, it is more effective to add gluten of about 30~60 mg/l as an adsorbent at the same condition and to irradiate the electron beam of 1.0–2.0 kGy.

As described above, the above methods for removing the Cr and Hg ions from the wastewater by irradiating the electron beam has a simple process and a quick processing time due to rapid precipitation. Particularly, although the vegetable adsorbent such as economic flour is used, an effect of removing the $Cr^{6+}$ and Hg more than 99% can be obtained.

Processing of wastewater containing fluorine

The fluorion existing in the natural world are very extremely rare and do not affect the human being ecologically. However, the fluorine collected more than a predetermined concentration affects the human being. Accordingly, the amount of the fluorine contained in the wastewater is severely restricted in each country.

A wastewater treatment for processing wastewater containing fluorion is same as the processing method described with reference to FIGS. 1 and 2. In this embodiment, only the adsorbent to be used and the amount of the irradiated electron beam to remove the fluorion are specified.

Also, prior to adding the adsorbent containing the fluorine of high concentration (10 ppm or more), it is preferable that the wastewater treatment method for removing the fluorion further includes a chemical processing step of reducing the fluoric ion concentration into an intermediate concentration of 10–15 ppm.

Figure 9:
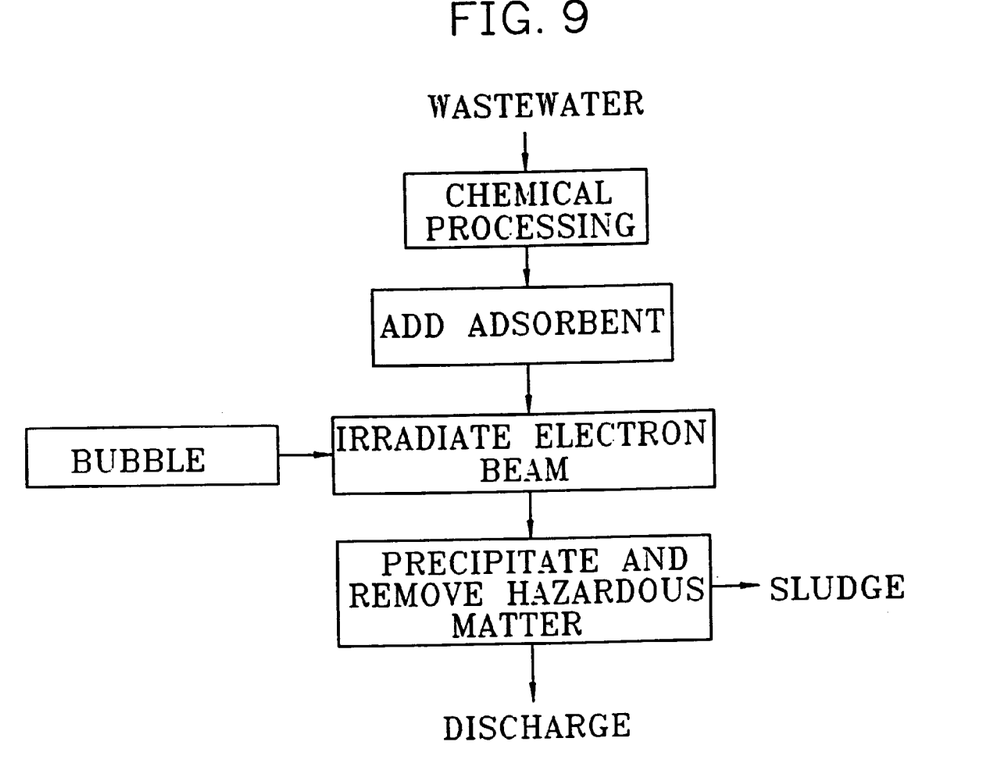
FIG. 9 is a flow-chart diagram showing a wastewater treatment process according to a modified embodiment of the present invention.

FIG. 9 is a flow-chart diagram showing a wastewater treatment method for processing the wastewater containing the fluorion for according to an embodiment of the present invention. Referring to FIG. 9, the wastewater treatment method for processing the wastewater containing the fluorion will be specifically described.

The wastewater treatment method according to this embodiment of the present invention basically includes an adsorbent addition step, an electron beam irradiation step, and a precipitation removal step. Further, it is preferable to further including a bubbling step.

Since these steps have been described with reference to FIGS. 1 and 2, the detailed description thereof will be omitted. Here, an organic compound is used as an adsorbent in the adsorbent addition step.

Acrylamide, gluten, methyl-methacrylate, methyl-acrylate, vinyl-acetate, styrenemonomer, and so on all of which are easily polymerized even with a small irradiation amount, are used as organic compounds. Among them, it is preferable to use an adsorbent containing acrylamide and gluten since an adsorption effect becomes better and a precipitation velocity after irradiation of the electron beam becomes quicker.

Also, according to the most preferred embodiment of the present invention, a chemical processing step for reducing the fluorion concentration among the fluorine-containing wastewater, for example, high concentration of 100 ppm or higher, into an intermediate concentration, for example, 10–15 ppm is further included prior to the adsorbent addition step. As a result, the fluorion concentration of 3 ppm or lower can be effectively accomplished by irradiation of the electron beam in the following step.

Therefore, as shown in FIG. 9, the most preferred embodiment of the present invention includes a chemical processing step, an adsorbent addition step, a bubbling step, an electron beam irradiation step, and a precipitation removal step.

It is preferable to use a Ca compound addition method as the chemical processing step which is a high-concentration fluorine processing method and a most general method among several methods, in which $Ca(OH)_2$ and $CaCl_2$ are added in the fluorine-containing wastewater and the fluorion are precipitated and separated in the form of $CaF_2$ which is insoluble in water. Thus, in this chemical processing step, the fluorine-containing wastewater of the high concentration (100 ppm or higher) is reduced to an intermediate concentration (10–15 ppm or below).

The following steps of adsorbent addition, bubbling, electron beam irradiation, and precipitation removal are same as those of the above description.

In the adsorbent addition step, it is preferable that an adsorbent containing acrylamide and gluten are added with an injection concentration of 1000–10000 ppm. It is further preferable that the concentration is between 1500–3000 ppm.

Also, in the electron beam irradiation step, an appropriate amount of irradiated electron beam is between 3–10 kGy.

If the above-described chemical processing step and electron beam irradiation step are passed through, the fluorine-containing wastewater of the high concentration of 100 ppm or more (in case of a general industrial wastewater, 400–700 ppm) can be effectively reduced into a low concentration of 3 ppm or below. Also, the processing time can be shorter than the case when the conventional chemical processing method is used. Since the amount of the used chemicals is reduced, the amount of the generated sludges is reduced, to thereby cause the processing costs to decrease.

As described above, the fluorine-containing wastewater treatment method using the electron beam according to the present invention can remove the fluorine in a short time when compared with the conventional method. An efficiency of removal of the fluorine is improved and the fluorine concentration can be lowered into a low concentration of 3 ppm or below, which provides a more economical method.

Second embodiment

Figure 10:
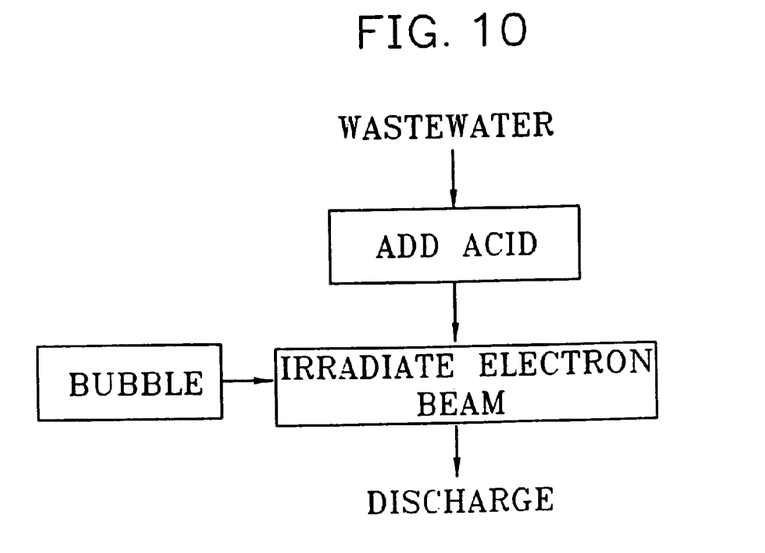
FIG. 10 is a flow-chart diagram showing a wastewater treatment process according to another preferred embodiment of the present invention.

FIG. 10 is a flow-chart diagram showing a wastewater treatment processing according to another preferred embodiment of the present invention.

The wastewater treatment method according to the second embodiment converts the $Cr^{6+}$ contained in the wastewater into $Cr^{3+}$. The $Cr^{3+}$ are not only less hazardous but also are precipitated more easily by a general precipitation method than the $Cr^{6+}$. Therefore, the $Cr^{6+}$ should be converted into the $Cr^{3+}$ as in the method according to the present invention. Hereinafter, this embodiment will be described with reference to FIGS. 2 and 10.

First, to convert the $Cr^{6+}$ into $Cr^{3+}$ via electron beam irradiation, it requires to adjust pH of the heavy metal wastewater. It can be seen from an experiment that it is appropriate that the pH of the wastewater should be 4.5 or below. Thus, when the pH of the heavy metal contained wastewater is 4.5 or above, acid is added in the wastewater and the pH needs to be lowered to be substantially 4.5 or below. When the pH is 4.5 or below, the acid wastewater is processed in the same way as the above-described embodiment of the present invention.

The heavy metal wastewater into which the $Cr^{6+}$ are dissolved and in which the pH is adjusted into 4.5 or below, flows into the reactor tank 23.

The electron beam accelerator 24 is installed in the upper portion of the reactor tank 23, to enable the electron beam to be efficiently irradiated into the wastewater containing the heavy metal. The amount of the irradiated electron beam is 0.8 kGy.

Meanwhile, the bubbling apparatus 22 injects the bubbling gas into the wastewater in order to uniformly irradiate the electron beam into the heavy metal wastewater accommodated in the reactor tank. The bubbling gas forms bubbles in the wastewater. It is preferable that air, or inert gas such as argon be used as the bubbling gas. Finally, the $Cr^{6+}$ are converted into $Cr^{3+}$ by the irradiation of the electron beam and discharged. The $Cr^{3+}$ which have a small amount of toxicity and simply increase pH of the heavy metal. wastewater as well, can be easily removed from the wastewater.

Figure 11:
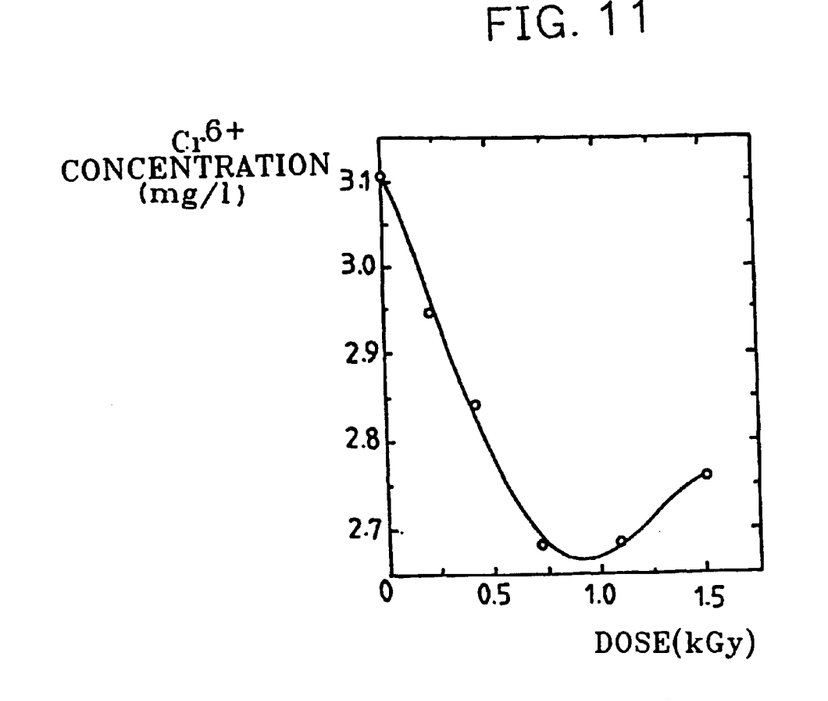
FIG. 11 is a graphical view showing a relationship between the amount of irradiated electron beam and the concentration of the $Cr^{6+}$ ions according to the FIG. 10 embodiment.

FIG. 11 is a graphical view showing a relationship between the amount of irradiated electron beam and the concentration of the $Cr^{6+}$ according to the FIG. 10 embodiment. The FIG. 11 graph shows the concentration of the $Cr^{6+}$ (vertical axis) in the wastewater with respect to the amount of the irradiated electron beam (horizontal axis), when the pH of the heavy metal wastewater is about 4.5. As can be seen from the FIG. 11 graph, the concentration of the $Cr^{6+}$ is continuously decreased according to the amount of irradiated electron beam until the amount of the irradiated electron beam reaches 0.8 kGy, and is increased when the former is more than 0.8 kGy. This reason is because the $Cr^{3+}$ are converted into $Cr^{6+}$ again in the case of the amount of the irradiated electron beam of about 0.8 kGy or more. Thus, it can be seen that the proper amount of the irradiated electron beam is about 0.6~1.5 kGy and the optimal amount of the irradiated electron beam is about 0.7~0.9 kGy when the pH of the heavy metal wastewater is about 4.5.

Figure 12:
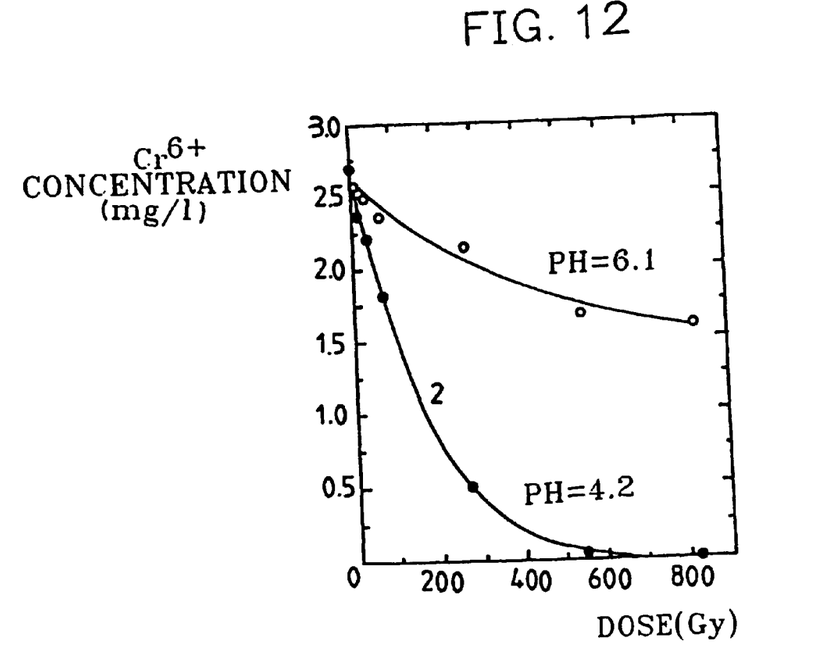
FIG. 12 is a graphical view showing a relationship between the amount of irradiated electron beam and the concentration of the $Cr^{6+}$ ions in the case when the pH values of the heavy metal wastewater differ from each other.

FIG. 12 is a graphical view showing a relationship between the amount of irradiated electron beam and the concentration of the. $Cr^{6+}$ in the case when the pH values of the heavy metal wastewater differ from each other.

The FIG. 12 graph shows the concentration of the $Cr^{6+}$ (vertical axis) in the wastewater while increasing the amount of the irradiated electron beam (horizontal axis) up to 0.8 kGy, when the pH of the heavy metal wastewater is about 6.1 (case 1) and about 4.2 (case 2). As can be seen from the FIG. 12 graph, the $Cr^{6+}$ are efficiently converted into the $Cr^{3+}$ when the pH of the heavy metal wastewater is about 4.5 or below all over the areas.

As described above, the present invention can maintain the pH of the heavy metal wastewater and at the same time, a proper electron beam are irradiated thereinto, in such a manner that the $Cr^{6+}$ are easily converted into the $Cr^{3+}$.

While only certain embodiments of the invention have been specifically described herein, it will apparent that numerous modifications may be made thereto without departing from the spirit and scope of the invention.

What is claimed is:

1. A wastewater treatment method comprising the steps of:
    adding an adsorbent used as a complex which can be reacted on hazardous matter, in the wastewater containing the hazardous matter;
    irradiating by electron beam the wastewater added with the adsorbent to accelerate the reaction between the adsorbent and the hazardous matter; and
    precipitating and removing the condensed particles which are formed in the step of irradiating by electron beam.

2. The wastewater treatment method according to claim 1, further comprising, between said step of adding and said step of precipitating and removing, a step of bubbling the wastewater by injecting a gas selected from the group consisting of air, nitrogen gas, and argon gas into the wastewater, in order that the electron beam are efficiently irradiated.

3. The wastewater treatment method according to claim 1, wherein the hazardous matter is lead (Pb) and/or cadmium (Cd).

4. The wastewater treatment method according to claim 3, wherein said adsorbent is sodium formate (HCOONa) having a concentration of $10^{-4}$~$10^{-1}$M.

5. The wastewater treatment method according to claim 4, wherein a cadmium removal efficiency is optimal when the amount of irradiated electron beam is about 2.5~4.0 kGy.

6. The wastewater treatment method according to claim 4, wherein a lead removal efficiency is optimal when the amount of the irradiated electron beam is at about 0.6~0.8 kGy.

7. The wastewater treatment method according to claim 3, wherein said step of precipitating and removing comprises the step of heating the wastewater at a temperature of 60~90° C., in which a heating time is not greater than 30 minutes.

8. The wastewater treatment method according to claim 1, wherein said hazardous matter is fluorine.

9. The wastewater treatment method according to claim 8, wherein said adsorbent is an organic compound which is water-insoluble and comprises vegetable protein.

10. The wastewater treatment method according to claim 9, wherein said organic compound contains acrylamide and gluten.

11. The wastewater treatment method according to claim 9, wherein an addition concentration of said adsorbent is 1000–10000 ppm.

12. The wastewater treatment method according to claim 8, further comprising, before said step of adding, a chemical processing step of lowering the high fluorion concentration into an intermediate concentration of 10–15 ppm or below, said chemical processing step uses a Ca compound addition method of adding $Ca(OH)_2$ and $CaCl_2$, in order to separate the fluorion into $CaF_2$ insoluble to water.

13. The wastewater treatment method according to claim 8, wherein the amount of said irradiated electron beam is about 3~10 kGy.

14. The wastewater treatment method according to claim 1, wherein said hazardous matter is Cr and/or Hg.

15. The wastewater treatment method according to claim 14, wherein said adsorbent is a material containing a protein component having a water-insoluble polypeptide structure.

16. The wastewater treatment method according to claim 15, wherein said adsorbent is flour whose addition concentration is about 500 mg/l or below.

17. The wastewater treatment method according to claim 16, wherein the amount of said irradiated electron beam is about 2 kGy or below.

18. The wastewater treatment method according to claim 15, wherein said adsorbent is gluten whose addition concentration is about 100 mg/l or below.

19. The wastewater treatment method according to claim 18, wherein the amount of said irradiated electron beam is about 2 kGy or below.

20. A wastewater treatment method for processing wastewater containing $Cr^{6+}$ the wastewater treatment method comprising the steps of:

irradiating wastewater by electron beam in order to convert $Cr^{6+}$ into $Cr^{3+}$; and bubbling the wastewater by injecting a gas selected from the group consisting of air, nitrogen gas, and argon gas into the wastewater, in order that the electron beam are efficiently irradiated.

21. The wastewater treatment method according to claim 20, further comprising, before said step of irradiating, a step of maintaining the concentration of the $Cr^{6+}$ at the pH of about 4.5.

22. The wastewater treatment method according to claim 21, wherein the amount of said irradiated electron beam is about 0.6–1.5 kGy.

23. The wastewater treatment method according to claim 22, the amount of said irradiated electron beam is about 0.7–0.9 kGy.

24. The wastewater treatment method according to claim 20, wherein the amount of said irradiated electron beam is about 0.6–1.5 kGy.

25. The wastewater treatment method according to claim 24, the amount of said irradiated electron beam is about 0.7–0.9 kGy.

* * * * *